United States Patent
Folmsbee et al.

(10) Patent No.: US 9,368,817 B2
(45) Date of Patent: Jun. 14, 2016

(54) IN-SITU FUEL CELL STACK RECONDITIONING

(75) Inventors: Daniel T. Folmsbee, Victor, NY (US); Balasubramanian Lakshmanan, Pittsford, NY (US); John P. Salvador, Penfield, NY (US); Joe C. Machuca, Rochester, NY (US); Bernd Krause, Liederbach (DE); David R. Savage, Rochester, NY (US); David A. Arthur, Honeoye Falls, NY (US); Derek R. Lebzelter, Rochester, NY (US)

(73) Assignee: GL Global Technology Operations LLC, Detroit, MI (US)

( * ) Notice: Subject to any disclaimer, the term of this patent is extended or adjusted under 35 U.S.C. 154(b) by 1763 days.

(21) Appl. No.: 12/580,863

(22) Filed: Oct. 16, 2009

(65) Prior Publication Data

US 2011/0091780 A1 Apr. 21, 2011

(51) Int. Cl.
*H01M 8/04* (2006.01)

(52) U.S. Cl.
CPC ........ *H01M 8/04388* (2013.01); *H01M 8/0441* (2013.01); *H01M 8/04126* (2013.01); *H01M 8/04231* (2013.01); *H01M 8/04492* (2013.01); *H01M 8/04507* (2013.01); *H01M 8/04753* (2013.01); *H01M 8/04828* (2013.01); *H01M 8/04835* (2013.01); *H01M 8/04843* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 5,082,472 A | * | 1/1992 | Mallouk | B01D 61/38 95/49 |
| 6,066,408 A | * | 5/2000 | Vitale et al. | 429/413 |
| 7,591,880 B2 | * | 9/2009 | Levan | H01M 8/04089 95/104 |
| 2003/0224226 A1 | * | 12/2003 | Jia | H01M 8/04089 429/413 |
| 2003/0224227 A1 | * | 12/2003 | Voss | H01M 8/04223 429/432 |
| 2006/0134472 A1 | * | 6/2006 | Bach | H01M 8/04119 429/413 |
| 2006/0147773 A1 | * | 7/2006 | Steinshnider | H01M 8/04014 429/414 |
| 2007/0287041 A1 | * | 12/2007 | Alp | H01M 8/04007 429/414 |
| 2011/0045365 A1 | * | 2/2011 | Cho | H01M 8/04141 429/413 |

* cited by examiner

*Primary Examiner* — Scott J Chmielecki
(74) *Attorney, Agent, or Firm* — John A. Miller; Miller IP Group, PLC

(57) ABSTRACT

A method for reconditioning a fuel cell stack. The method includes periodically increasing the relative humidity level of the cathode input airflow to the stack to saturate the cell membrane electrode assemblies to be greater than the relative humidity levels during normal stack operating conditions. The method also includes providing hydrogen to the anode side of the fuel cell stack at system shut down while the membrane electrode assemblies are saturated without stack loads being applied so that the hydrogen crosses the cell membranes to the cathode side and reacts with oxygen to reduce stack contaminants.

17 Claims, 2 Drawing Sheets

IN-SITU FUEL CELL STACK RECONDITIONING

BACKGROUND OF THE INVENTION

1. Field of the Invention

This invention relates generally to a system and method for reconditioning a fuel cell stack and, more particularly, to a system and method for reconditioning a fuel cell stack that includes increasing the humidification level of the cathode side of the stack to hydrate the cell membranes and providing hydrogen to the anode side of the fuel cell stack at system shut down without stack loads being applied so that the hydrogen crosses the membranes to the cathode side and reacts with oxygen to reduce contaminants.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have sufficient water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the gas diffusion layer (GDL), is particularly troublesome at low stack output loads.

As mentioned above, water is generated as a by-product of the stack operation. Therefore, the cathode exhaust gas from the stack will typically include water vapor and liquid water. It is known in the art to use a water vapor transfer (WVT) unit to capture some of the water in the cathode exhaust gas, and use the water to humidify the cathode input airflow. Water in the cathode exhaust gas at one side of the water transfer elements, such as membranes, is absorbed by the water transfer elements and transferred to the cathode air stream at the other side of the water transfer elements.

In a fuel cell system, there are a number of mechanisms that cause permanent loss of stack performance, such as loss of catalyst activity, catalyst support corrosion and pinhole formation in the cell membranes. However, there are other mechanisms that can cause stack voltage losses that are substantially reversible, such as the cell membranes drying out, catalyst oxide formation, and build-up of contaminants on both the anode and cathode side of the stack. Therefore, there is a need in the art to remove the oxide formations and the build-up of contaminants, as well as to rehydrate the cell membranes, to recover losses in cell voltage in a fuel cell stack.

Wet operation, that is, operation with a high amount of humidification, is desirable for system humidification, performance and contaminant removal. However, there are various reasons to operate a fuel cell stack with a lower amount of humidification, also known as dry conditions. For example, wet operation can lead to fuel cell stability problems due to water build up, and could also cause anode starvation resulting in carbon corrosion. In addition, wet operation can be problematic in freeze conditions due to liquid water freezing at various locations in the fuel cell stack. Therefore, there is a need in the art for systems that have been optimized for non-wet operating conditions.

SUMMARY OF THE INVENTION

In accordance with the teachings of the present invention, a method for reconditioning a fuel cell stack is disclosed. The method includes periodically increasing the relative humidity level of the cathode input airflow to the stack to saturate the cell membrane electrode assemblies to be greater than the relative humidity levels during normal stack operating conditions. The method also includes providing hydrogen to the anode side of the fuel cell stack at system shut down while the membrane electrode assemblies are saturated without stack loads being applied so that the hydrogen crosses the cell membranes to the cathode side and reacts with oxygen to reduce stack contaminants.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for reconditioning a fuel cell stack so as to recover stack voltage is merely exemplary in nature, and is in no way intended to limit the invention or its applications or uses.

Figure 1:
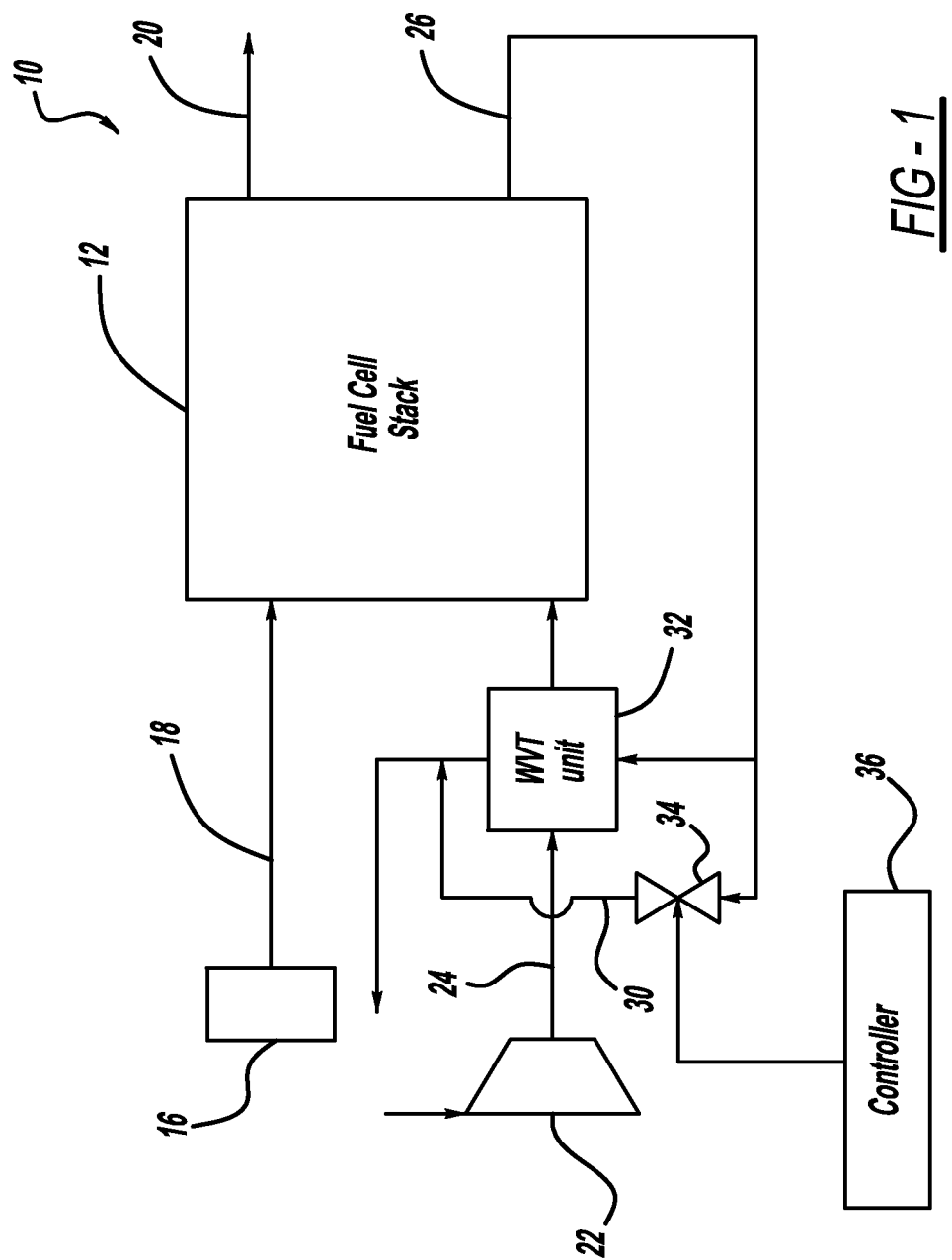
FIG. 1 is a schematic block diagram of a fuel cell system.

FIG. 1 is a schematic block diagram of a fuel cell system 10 including a fuel cell stack 12. The fuel cell stack 12 receives hydrogen from a hydrogen source 16 on anode input line 18 and provides an anode exhaust gas on line 20. A compressor 22 provides airflow to the cathode side of the fuel cell stack 12 on cathode input line 14 through a water vapor transfer (WVT) unit 32 that humidifies the cathode input air. The WVT unit 32 is employed in this embodiment as a non-limiting example, where other types of humidification devices may be applicable for humidifying the cathode inlet air, such as enthalpy wheels, evaporators, etc. A cathode exhaust gas is output from the stack 12 on a cathode exhaust gas line 26. The exhaust gas line 26 directs the cathode exhaust to the WVT unit 32 to provide the humidity to humidify the cathode input air. A by-pass line 30 is provided around the WVT unit 32 to direct some or all of the cathode exhaust gas around the WVT unit 32 consistent with the discussion herein. In an alternate embodiment, the by-pass line can be an inlet by-pass. A by-pass valve 34 is provided in the by-pass line 30 and is controlled to selectively redirect the cathode exhaust gas through or around the WVT unit 32 to provide the desired amount of humidity to the cathode input air.

A controller 36 controls whether the by-pass valve 34 is opened or closed, and how much the by-pass valve 34 is opened. By controlling the by-pass valve 34, the controller 36 is able to determine how much cathode exhaust gas is directed through the WVT unit 32, and thus how much water from the cathode exhaust gas will be used to humidify the cathode input air.

Cathode outlet humidification is a function of stack operating conditions, including cathode and anode inlet relative humidity, cathode and anode stoichiometry, pressure and temperature. During reconditioning, discussed below, it is desirable to increase the humidification level of the membranes. This is typically accomplished by increasing the cathode outlet relative humidity. In this embodiment, the by-pass valve 34 is controlled during stack reconditioning to increase the humidification level of the cathode inlet air. The stack operating condition set-points will then be manipulated to further increase the cathode outlet relative humidity to the set-point, as is known in the art. Examples include reducing the stack temperature or reducing the cathode stoichiometry.

The fuel cell stack 12 may be operated relatively dry, such as with a cathode inlet and exhaust relative humidity that is less than 100%. Such dry stack operation over prolonged periods of time could lead to the drying-out of components in the stack 12, such as the cell membranes and the MEA catalyst layers. Drying out of the stack 12 is more likely under low power operation when the amount of water produced by the fuel cell stack 12 is low, but is more noticeable under high power. In addition, operation under low power and high cell voltages leads to a higher rate of oxide formation on the catalyst, particularly when a precious metal catalyst is used.

As will be discussed below, the present invention provides stack conditioning to remove contaminants from within the stack 12, such as sulfates and chlorides, that affect stack performance. During stack reconditioning, the fuel cell stack 12 is operated under wet conditions at semi-regular intervals. By operating the stack relatively wet, various ions and other molecules will go into solution within the stack 12 and be better able to be driven out by water flow through the reactant gas flow channels. Such wet conditions, for example, may be in excess of 110% relative humidity at high current densities, although other percentages of relative humidity could be used. The fuel cell system is shut down while maintaining these wet conditions. Immediately after the fuel cell system 10 is shut down, the cathode side catalyst is blanketed with hydrogen and a mixture of other gases, such as nitrogen and water vapor. This procedure is described in more detail below.

Figure 2:
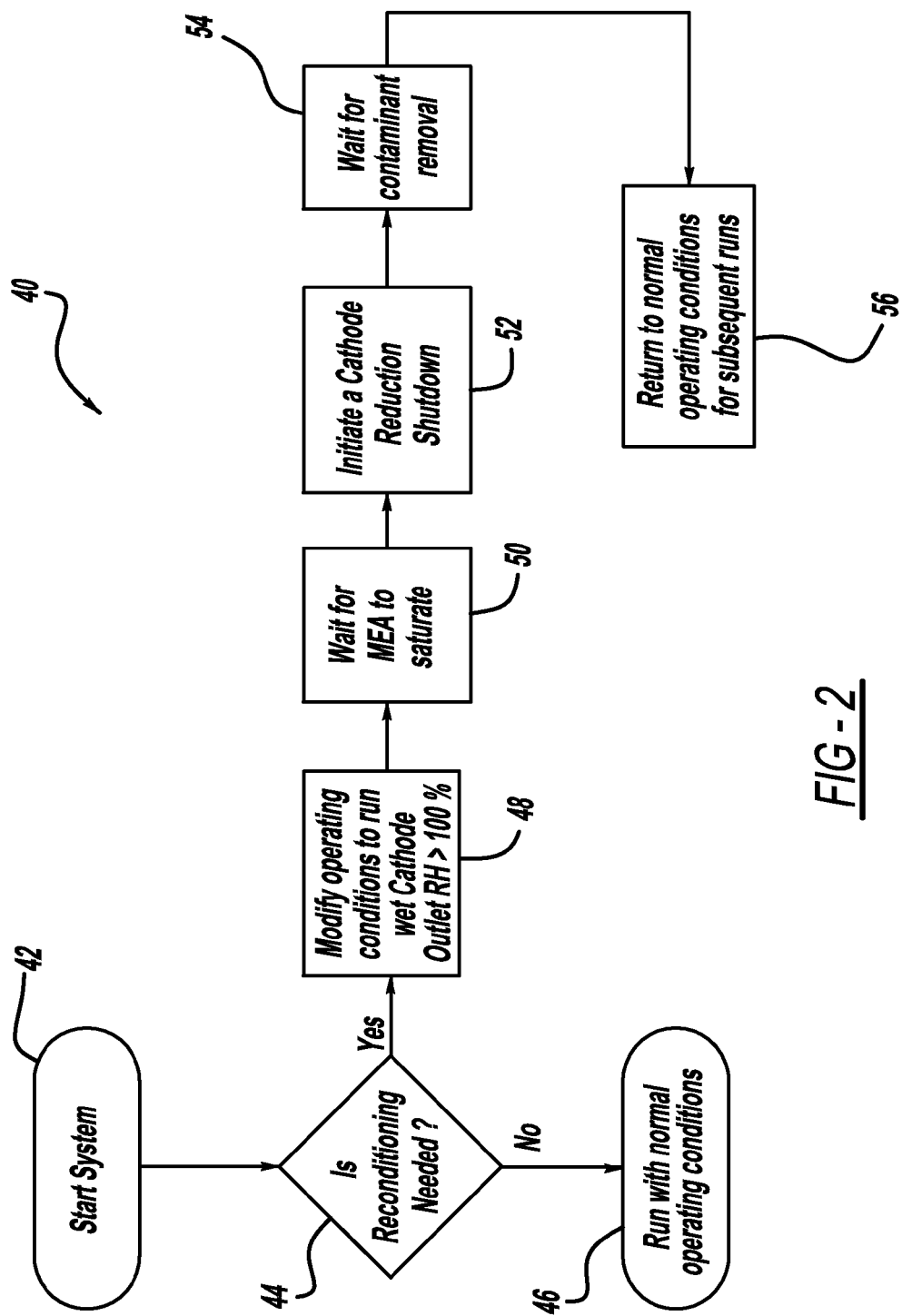
FIG. 2 is a flow diagram showing a method for removing oxidation and contaminant build up in a fuel cell stack.

FIG. 2 is a flow diagram 40 showing steps for reconditioning the fuel cell stack 12, thereby enabling recovery of the voltage of the fuel cell stack 12. A system start is the first step at box 42. The controller 36 determines whether reconditioning of the fuel cell stack 12 is needed at decision diamond 44. The present invention contemplates any suitable algorithm or device that can detect the affects from stack contaminants that may require stack reconditioning, such as low voltages, low humidity levels, low stack power, etc. If the controller 36 determines that reconditioning of the fuel cell stack 12 is not needed at the decision diamond 44, then the controller 36 does not enable the reconditioning procedure and the fuel cell system 10 operates under normal operating conditions at box 46.

If, however, the controller 36 determines that reconditioning of the fuel cell stack 12 is needed at the decision diamond 44, then the procedure for reconditioning the stack 12 is triggered. The controls and calibrations necessary to perform the reconditioning procedure are embedded in the software of the controller 36. The controller 36 modifies the operating conditions such that the cathode exhaust gas on the line 26 is operated under wetter conditions at box 48 than would occur under normal operating conditions. An example of such wet conditions is a cathode exhaust gas relative humidity on the line 26 that is in excess of 100% relative humidity, depending on the velocities of anode and cathode gases. If the gas velocity is low, normal outlet relative humidity on the line 26 may be maintained. However, it will be readily apparent to those skilled in the art that wet conditions that are of a different outlet relative humidity and varying gas velocities may be used.

Next, the controller 36 waits for the cell MEAs to saturate to a desired relative humidity level at box 50. Liquid water flooding the fuel cell stack during saturation at box 50 on either the anode or the cathode side can be managed by actively controlling bleed, drain, and other system valves, or can be managed by increasing cathode stoichiometry. One example of avoiding flooding of the stack is to operate the stack at a higher current density, thereby utilizing higher cathode and anode velocities. However, one skilled in the art will recognize that there are other ways to prevent flooding.

By way of example, the amount of time necessary to saturate the cell MEAs to the desired humidity level may be a period of time in excess of 20 minutes at a stack current density in the range of 0.4-1 $A/cm^2$. Lower current densities can also be effective; however they may require longer run times than those at higher current density. Those having skill in the art will readily recognize that a different period of time and a different current density range will achieve the desired saturation level. Thus, this example is not intended to limit the scope of the invention in any way.

Once the cell MEAs have saturated to the desired humidity level at the box 50, the controller 36 initiates a cathode reduction upon system shut down at box 52. Cathode reduction requires that hydrogen be used to takeover and blanket the cathode side of the fuel cell stack 12. Any dry-out purges that the system would normally undergo upon shut down are not used during this procedure. By maintaining excess hydrogen in the anode side of the stack 12 upon system shut down, the hydrogen is able to cross the membranes by means of permeation to the cathode side, by direct injection, or a combination thereof, to consume available oxygen. By consuming oxygen on the cathode side of the stack 12 using hydrogen, various contaminants are reduced in the cathode side, such as those that may be bonded to platinum sites in the cathode catalyst. It is important to refrain from applying loads to the stack 12 that would accelerate the oxygen consumption during this step of the procedure. Thus, the process described so far includes first saturating the MEAs in the fuel cells in the stack 12 by humidifying the cathode inlet air above normal humidity levels, and then maintaining that saturation level to system shut down at which time hydrogen is introduced to the anode side of the fuel cell stack 12 under no load conditions to consume oxygen on the cathode side. Of course, there are limitations as to how wet the fuel cell stack 12 can be after system shut down under certain operating conditions, such as freeze conditions.

After the cathode side has been adequately blanketed with hydrogen at the box 52, the controller 36 waits for a period of time to allow for contaminant removal at box 54. By way of example, and in no way intended to limit the scope of the invention, the amount of time allowed for contaminant removal could be twenty minutes. Additional soak time may be beneficial, as more water vapor will condense when the system cools down, which will then be useful for removal of a greater fraction of the contaminants. If the required amount of time is not met prior to a system start at box 56, the benefit may not be fully realized, and the procedure may need to be repeated. When the fuel cell system 10 is restarted at box 56 after a successful reconditioning, it should function under its normal operating conditions.

The above procedure enhances the ability of the fuel cell MEAs to react the fuel and oxidant because (1) the higher fraction of liquid water enables the soluble contaminates to wash off, (2) the higher level of membrane electrode saturation increases the proton conductivity of the membrane and electrode, (3) the reduction in voltage under wet conditions leads to the reduction in the surface coverage of sulfate ($HSO_4^-$)-like poisoning species which then get washed off during subsequent operation, (4) the reduction of surface oxides, such as platinum oxide (PtO) and platinum hydroxide (PtOH), which expose more of the precious metal sites, and (5) the subsequent increase in potential by waiting for contaminant removal also helps in burning off, i.e., oxidizing, ethylene glycol and other organic contaminants.

Thus, the fuel cell stack 12 reconditioning process will provide a cell voltage performance increase by reducing the voltage losses associated with membrane resistance and catalyst layer performance. Testing has revealed that this benefit could be as large as 50 mV per cell. This increase is sustainable for hundreds of hours and can be repeated for a similar level of recovery. As a result of this increase, stack life will increase resulting in a longer service life for the fuel cell stack 12. Regular intervals of this procedure will result in a higher level of maximum performance and greater system efficiency.

This procedure could also serve to rehumidify any cathode water rehumidification device, such as the WVT unit 32.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for reconditioning a fuel cell stack, said method comprising:
   determining whether fuel cell stack reconditioning is needed;
   increasing the humidification level of a cathode side of the fuel cell stack over the relative humidity of the cathode side during normal operating conditions if stack reconditioning is needed;
   waiting for cell membranes in the fuel cell stack to saturate after the humidification level of the cathode side is increased;
   providing a hydrogen take-over of the cathode side during shut down of the fuel cell stack; and
   waiting for contaminants to be removed as a result of the increased humidification level and the hydrogen take-over.

2. The method according to claim 1 wherein increasing the humidification level of the cathode side increases the humidity level to greater than or equal to 100% relative humidity.

3. The method according to claim 1 wherein the cell membranes remain saturated for a predetermined period of time before hydrogen take-over of the cathode side occurs.

4. The method according to claim 1 wherein the hydrogen take-over causes hydrogen to cross the cell membranes from an anode side to the cathode side to consume oxygen.

5. The method according to claim 1 further comprising refraining from applying loads to the stack during the hydrogen take-over.

6. The method according to claim 1 wherein the reconditioning is performed periodically during the normal operation of the fuel cell stack.

7. A method for reconditioning a fuel cell stack to remove contaminants from the fuel cell stack, said method comprising:
   operating the fuel cell stack under wet conditions by increasing the relative humidity of the stack;
   saturating membrane electrode assemblies in the fuel cell stack; and
   shutting the fuel cell stack down while the membrane electrode assemblies are saturated.

8. The method according to claim 7 further comprising providing a hydrogen take-over of the cathode side of the fuel cell stack during stack shut down and waiting for contaminants to be removed as a result of the increased humidification level and the hydrogen take-over.

9. The method according to claim 8 wherein the hydrogen take-over causes hydrogen to cross the cell membranes from an anode side to the cathode side to consume oxygen.

10. The method according to claim 8 wherein loads are refrained from being applied during the hydrogen take-over.

11. The method according to claim 7 wherein the relative humidity is increased to greater than or equal to 100% relative humidity.

12. The method according to claim 7 wherein the cell membranes remain saturated for a predetermined period of time before hydrogen take-over of the cathode side occurs.

13. The method according to claim 7 wherein the reconditioning occurs periodically during the normal operation of the fuel cell stack.

14. A method for reconditioning a fuel cell stack, said method comprising:
- determining whether fuel cell stack reconditioning is needed;
- increasing the humidification level of a cathode side of the fuel cell stack over the relative humidity of the cathode side during normal operating conditions if stack reconditioning is needed;
- waiting for cell membranes in the fuel cell stack to saturate after the humidification level of the cathode side is increased;
- providing a hydrogen take-over of the cathode side during shut down of the fuel cell stack wherein the hydrogen take-over causes hydrogen to cross the cell membranes from an anode side to the cathode side to consume oxygen; and
- waiting for contaminants to be removed as a result of the increased humidification level and the hydrogen take-over.

15. The method according to claim 14 wherein the cell membranes remain saturated for a predetermined period of time before hydrogen take-over of the cathode side occurs.

16. The method according to claim 14 further comprising refraining from applying loads to the stack during the hydrogen take-over.

17. The method according to claim 14 wherein the reconditioning is performed periodically during the normal operation of the fuel cell stack.

* * * * *